(12) United States Patent
Ruth et al.

(10) Patent No.: US 7,109,145 B2
(45) Date of Patent: *Sep. 19, 2006

(54) NOBLE METAL-CONTAINING SUPPORTED CATALYST AND A PROCESS FOR ITS PREPARATION

(75) Inventors: Karsten Ruth, Alzenau (DE); Peter Biberbach, Rodenbach (DE); Karl-Anton Starz, Rodenbach (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,864

(22) Filed: Dec. 10, 2004

(65) Prior Publication Data

US 2005/0101481 A1    May 12, 2005

Related U.S. Application Data

(62) Division of application No. 10/136,691, filed on Apr. 30, 2002, now Pat. No. 6,861,387.

(30) Foreign Application Priority Data

May 5, 2001    (EP) .................... 0110891

(51) Int. Cl.
- *B01J 23/00* (2006.01)
- *B01J 29/00* (2006.01)
- *B01J 21/00* (2006.01)
- *H01M 4/00* (2006.01)

(52) U.S. Cl. .......... 502/326; 502/66; 502/74; 502/184; 502/185; 502/243; 502/261; 502/262; 502/327; 502/329; 502/330; 502/331; 502/332; 502/333; 502/334; 502/339; 502/344; 502/347; 502/355; 502/415; 502/439; 429/40; 429/44

(58) Field of Classification Search .......... 502/65, 502/66, 73, 74, 184, 185, 243, 261–263, 502/325–327, 329, 330, 331–334, 339–351, 502/355, 407, 415, 439; 429/40, 44
See application file for complete search history.

(56) References Cited

U.S. PATENT DOCUMENTS 4,137,373 A    1/1979    Jalan et al.

(Continued)

FOREIGN PATENT DOCUMENTS

DE    3643332 A    11/1987

(Continued)

OTHER PUBLICATIONS

European Search Report, OMG AG & Co. KG, Nov. 5, 2001.

*Primary Examiner*—Cam N. Nguyen
(74) *Attorney, Agent, or Firm*—Kalow & Springutt LLP; John J. Santalone

(57) ABSTRACT

The invention provides a noble metal-containing supported catalyst which contains one of the noble metals from the group Au, Ag, Pt, Pd, Rh, Ru, Ir, Os or alloys of one or more of these noble metals in the form of noble metal particles on a powdered support material. The particles deposited on the support material have a degree of crystallinity, determined by X-ray diffraction, of more than 2 and an average particle size between 2 and 10 nm. The high crystallinity and the small particle size of the noble metal particles lead to high catalytic activity for the catalyst. It is particularly suitable for use in fuel cells and for the treatment of exhaust gases from internal combustion engines.

15 Claims, 1 Drawing Sheet

U.S. PATENT DOCUMENTS

| | | |
|---|---|---|
| 4,145,314 A | 3/1979 | Fung et al. |
| 4,146,504 A | 3/1979 | Deffeyes |
| 4,716,087 A | 12/1987 | Ito et al. |
| 5,041,195 A | 8/1991 | Taylor et al. |
| 5,079,107 A | 1/1992 | Jalan |
| 5,132,193 A | 7/1992 | Reddy et al. |
| 5,133,842 A | 7/1992 | Taylor et al. |
| 5,149,680 A | 9/1992 | Kitson et al. |
| 5,489,563 A | 2/1996 | Brand et al. |
| 5,861,222 A | 1/1999 | Fischer et al. |
| 5,965,754 A | 10/1999 | Clark et al. |
| 6,239,065 B1 | 5/2001 | Schulz et al. |

FOREIGN PATENT DOCUMENTS

| | | |
|---|---|---|
| EP | 0355853 A | 2/1990 |
| EP | 0386764 A | 9/1990 |
| EP | 0694982 A | 1/1996 |
| EP | 0880188 A | 11/1998 |
| EP | 0994520 A | 4/2000 |
| EP | 1046423 A | 10/2000 |

NOBLE METAL-CONTAINING SUPPORTED CATALYST AND A PROCESS FOR ITS PREPARATION

This application is a divisional of U.S. patent application Ser. No. 10/136,691, filed Apr. 30, 2002, now U.S. Pat. No. 6,861,387, the entire disclosure of which is hereby incorporated herein by reference.

FIELD OF THE INVENTION

The present invention provides a noble metal-containing supported catalyst which contains a noble metal selected from the group consisting of Au, Ag, Pt, Pd, Rh, Ru, Ir, Os and mixtures thereof and a process for the preparation thereof.

BACKGROUND OF THE INVENTION

Noble metal-containing supported catalysts are used in many industrial fields such as, for example, the synthesis of chemical compounds, the conversion of harmful substances in the exhaust gases from internal combustion engines and as electrocatalysts for fuel cells, to mention only a few fields of application.

To produce the highest possible catalytic activity for the noble metal, they have to be applied to the surface of the particular support material in the highest possible dispersion with particle sizes in the range between 1 and 15 nm. A small particle size in itself, however, is not a guarantee of high activity. A poorly developed crystal structure in the platinum particles thus also leads to diminished catalytic activity.

Similar considerations also apply to the quality of alloy formation of alloy catalysts. It is known in the art that ternary alloy catalysts for fuel cells with an ordered crystal structure have a catalytic activity for the electrochemical reduction of oxygen which is at least twice as great as that of a non-alloyed platinum catalyst. The catalyst is prepared by depositing the alloy components on the support material by impregnation. The alloy is formed by thermal treatment at 900° C. for a period of one hour under an atmosphere of nitrogen.

Support materials which are used for supported catalysts include a variety of materials. In general, the support materials, depending on the field of application, all have a high specific surface area, the so-called BET surface area (measured by nitrogen adsorption, in accordance with DIN 66132), of more than 10 m$^2$/g. For fuel cells, electrically conductive carbon materials are used as supports for the catalytically active components. In the case of car exhaust catalysis, however, oxidic support materials such as, for example, active aluminium oxides (for example γ-aluminium oxide), aluminium silicate, zeolite, titanium oxide, zirconium oxide, rare earth oxides or mixtures or mixed oxides thereof are used.

Precursor compounds of the catalytically active components are deposited on the surface of these materials and are converted into the final catalytically active form by subsequent thermal treatment. The fineness of distribution (dispersion) of the catalytically active particles in the final catalyst, and thus the catalytic metal surface area available for the catalytic process, depends critically on the type of process and method used for these two processes (deposition and thermal treatment).

A variety of processes has been disclosed for deposition of the catalytically active components on the powdered support material. These include, for example, impregnation with an excess of impregnation solution. In this case an aqueous solution of the catalytically active components is added to the powdered support material, when the volume of the solution may be substantially greater than the water absorption capacity of the support material. Thus a material is produced which has a thick pasty consistency and which is dewatered, for example, in an oven at elevated temperatures of 80 to 150° C. Chromatographic effects may take place during the dewatering of this material which can lead to non-uniform distribution of the catalytically active components on the support material.

For pore volume impregnation, an amount of solvent is used to dissolve the catalytically active components which corresponds to about 70 to 110% of the absorption capacity of the support material for this solvent. The solvent is generally water. This solution is distributed as uniformly as possible, for example by spraying over the support material which is being rolled about in a tank. After distribution of the entire solution over the support material the latter is still free-flowing, despite the water content. Chromatographic effects can be largely avoided using pore volume impregnation. This method usually provides better results than the impregnation process using an excess of solvent described above.

For a process for so-called homogeneous deposition from solution, the support material is first suspended in, for example, water. Then an aqueous solution of precursor compounds of the catalytically active components is added using capillary injection with constant stirring. Capillary injection is understood to be the slow addition of the solution under the surface of the suspension of support material, using a capillary. As fast and as homogeneous a distribution as possible of the precursor compounds over the entire volume of the suspension is intended to be ensured by intensive stirring and slow addition. Here, some adsorption of the precursor compounds, and thus the formation of crystallisation seeds, takes place at the surface of the support material. The extent of this adsorption depends on the combination of support material and precursor compound. With material combinations which do not ensure adequate adsorption of the precursor compounds on the support material, or when chemical fixing of the catalytically active components to the support material is desired, the precursor compounds can be precipitated on the support material by capillary injection of a base into the suspension of the support material.

To complete preparation of the catalyst material, the support material coated with the catalytically active components is subjected to a subsequent thermal treatment which converts the precursors of the catalytically active components into the catalytically active form and optionally leads to the formation of an alloy. Temperatures of more than 300° C. up to 1000° C. and treatment times of 0.5 to 3 hours are required for this. Typically, batch processes are used for this in which the catalyst material is agglomerated and the noble metal particles become coarser due to the long treatment times and the sinter effects which take place. Noble metal particles up to 50 nm or larger can develop in this way. To form an alloy, temperatures above 900° C. and treatment times of at least 0.5 hours are usually required, wherein there is a risk of excessive particle growth due to sintering.

However, it is important that the catalysts have as high a surface area as possible (i.e. high dispersion) on the support in order to ensure high catalytic activity. Catalysts with average particle sizes for the noble metals of more than 20 nm are usually not very active.

Support materials coated with catalysts using known processes for treatment cannot simultaneously comply with the conflicting requirements for well developed crystallinity or alloy structure and small average particle diameters for the noble metal particles.

In an alternative process for the thermal treatment of powdered substances the powdered substances are treated in a high-temperature flow reactor. The treatment temperature in the flow reactor may be higher than 1000° C. The time of treatment may be varied between 0.01 seconds and a few minutes. Finely dispersed noble metals can then be deposited on, for example, aluminium oxide.

It has also been suggested that a turbulent or laminar burner be used as an essential source of heat. The process is thus performed in an oxidizing atmosphere and is not suitable for preparing catalysts on support materials made of carbon (graphite, carbon black), such as those used for fuel cells. The carbon black support would be oxidized and some would be burnt away.

Based on the forgoing, there is a need in the art for methods of preparing a noble metal-containing supported catalysts which have a high crystallinity or a well-developed alloy structure. There is also a need for noble metal-containing supported catalysts that have a small particle size and high dispersion.

SUMMARY OF THE INVENTION

The present invention provides a noble metal-containing supported catalyst which contains one of the noble metals from the group Au, Ag, Pt, Pd, Rh, Ru, Ir, Os or alloys of one or more of these metals on a powdered support material. The supported catalyst contains particles of noble metal deposited on the support material having a relative degree of crystallinity $C_x$, determined by X-ray diffraction, of more than 2, preferably more than 5, and an average particle size between 2 and 10 nm.

For a better understanding of the present invention together with other and further advantages and embodiments, reference is made to the following description taken in conjunction with the examples, the scope of the which is set forth in the appended claims.

BRIEF DESCRIPTION OF THE FIGURE

The preferred embodiments of the invention have been chosen for purposes of illustration and description but are not intended to restrict the scope of the invention in any way. The preferred embodiments of certain aspects of the invention are shown in the accompanying figure, wherein.

DETAILED DESCRIPTION OF THE INVENTION

Figure 1:
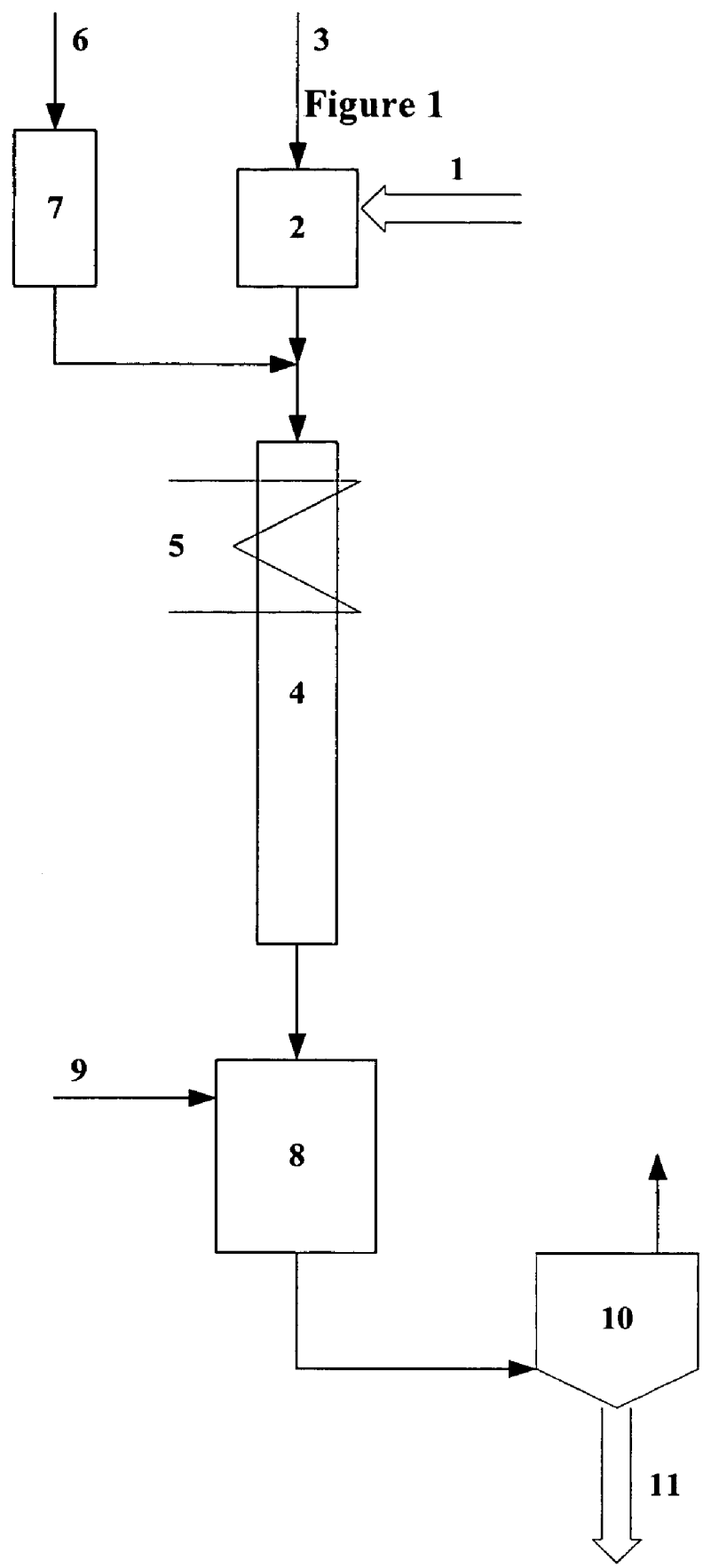
FIG. 1 illustrates an apparatus for thermal treatment of the catalyst precursor to prepare the catalyst of the current invention.

The present invention will now be described in connection with preferred embodiments. These embodiments are presented to aid in an understanding of the present invention and are not intended to, and should not be construed, to limit the invention in any way. All alternatives, modifications and equivalents that may become obvious to those of ordinary skill upon reading the disclosure are included within the sprit and scope of the present invention.

This disclosure is not a primer on preparing noble metal-containing supported catalysts, basic concepts known to those skilled in the art have not been set forth in detail.

The catalyst according to the invention, due to the thermal treatment which is described below, has a very high crystallinity. The relative degree of crystallinity $C_x$, which can be determined by radiographic measurements, was introduced by the inventors for the quantitative determination of crystallinity. It is defined by equation (1):

$$C_x = \frac{I_x - I_a}{I_a} \quad (1)$$

The relative degree of crystallinity is determined by radiographic measurements on powdered samples (powder diffractometer from the Stoe Co., copper $K\alpha$ radiation). In equation (1) $I_x$ represents the intensity of a specific diffraction reflex (measured in counts) from the catalyst sample. In the case of platinum, for example, the (hkl 111)-reflex is measured, which can be regarded as a measure of high electrochemical activity for the reduction of oxygen. $I_a$ is the intensity of X-ray diffraction from an X-ray-amorphous standard with the same composition as the catalyst sample, wherein the intensity of the X-ray diffraction reflex from the sample is determined at the same angle as for the sample. In the case of a carbon-supported platinum sample, the amorphous standard is a material with a particle size for the platinum of less than 2 nm which no longer exhibits any X-ray diffraction reflexes.

Depending on the intended application of the catalyst, different support materials can be used. For use as anode or cathode catalysts in fuel cells, electrically conductive support materials based on carbon from the group carbon black, graphite, active carbon and fibrous, graphitic nanotubes are normally used. For car exhaust gas catalysts, on the other hand, oxidic materials from the group of active aluminium oxide, aluminium silicate, zeolite, titanium oxide, zirconium oxide, rare earth oxides or mixtures or mixed oxides thereof are used. Furthermore, the noble metals in the catalyst may also be alloyed with at least one base metal from the group Ti, Zr, V, Cr, Mn, Fe, Co, Ni, Cu and Zn. These base metals act as promoters, that is they modify the catalytic effect of the noble metal.

The catalyst according to the invention is particularly preferably suitable for use as an anode or cathode catalyst in fuel cells. As a cathode catalyst it has, for example, platinum on carbon black in a concentration between 5 and 80 wt. %, with respect to the total weight of support material and platinum. As an anode catalyst, on the other hand, a CO-tolerant Pt/Ru alloy on carbon black in a concentration between 5 and 80 wt. %, with respect to the total weight of support material and alloy, is used, wherein the atomic ratio of Pt to Ru is between 5:1 and 1:5. The support material, carbon black, intended for these applications has a surface area of at least 40 m²/g.

An essential feature of the catalyst according to the invention is that the requirements for degree of crystallinity and for particle size are satisfied simultaneously. It then exhibits superior properties when used as a catalyst in fuel cells and for exhaust gas treatment for internal combustion engines.

These requirements can be satisfied when the following steps are taken during preparation. First, it has to be ensured that deposition of the noble metal on the support material is performed in such a way that the noble metal particles being formed are not larger than 10 nm. It was found that this condition can be complied with, for example, using pore volume impregnation or homogeneous deposition from solution. In the case of homogeneous deposition from solution, the coated support material is separated from the solution, dried and optionally subjected to mild calcination, which is performed in such a way that no substantial increase in the particle size of the noble metal particles occurs. A precursor of the catalyst which has to be subjected to further thermal treatment in order to increase the crystallinity and optionally for alloy production is obtained in this way. In the case of pore volume impregnation, the impregnated material can be used directly as a precursor for further thermal treatment without additional drying and calcination steps.

Subsequent thermal treatment of the precursor of the catalyst must ensure that the requirements relating to relative degree of crystallinity and average particle size are complied with. It was found that this is possible when the precursor of the catalyst is subjected to a brief thermal treatment at temperatures between 1000 and 1800° C. for a period of less than one minute.

The heat energy required for thermal treatment should preferably be transferred to the support material by radiation. This procedure enables rapid heating of the particles in the support material. Radiation heating is particularly preferred in the case of carbon-containing support materials such as, for example, carbon black or active carbon. These materials absorb the incident heat radiation almost completely and thus heat up particularly rapidly.

To perform thermal treatment of the support material, it is first continuously dispersed in an inert carrier gas heated to a temperature between 300 and 500° C. Preheating the carrier gas has to be restricted to a temperature at which no substantial increase in the size of the noble metal particles takes place. Then the gas stream is passed through a reaction tube. The temperature of the tube wall is maintained at the desired treatment temperature of 1000 to 1800° C. by an external heating system. The volume flow of the carrier gas is chosen so that the duration of passage through the reaction tube is in the range from a few seconds up to at most one minute. This residence time is kept short so that the actual heating of the support material takes place as a result of the transfer of radiated heat and only to a small extent by thermal conduction from the tube wall via the carrier gas. Suitable residence times, also called treatment times in the following, may amount up to 1 minute, but preferably are selected between 0.1 and 20 seconds and most preferably between 0.5 and 10 seconds.

Heating of the particles of support material by the supply of radiated heat takes place substantially more rapidly than would be possible by the transport of heat through the carrier gas. After leaving the reaction tube, the support material and carrier gas are cooled rapidly to a temperature below about 500° C. in order to prevent excessive crystallite growth. Afterwards, the catalyst material prepared in this way is separated from the carrier gas stream and taken for subsequent use.

Due to the very sudden heating up to the treatment temperature of the catalyst precursor followed by cooling after only a very short treatment time, it is ensured that good crystallinity or alloy structure can develop within the noble metal particles, but excessive particle growth due to diffusion on the surface of the support material is suppressed. The short treatment times mean that the use of substantially higher treatment temperatures than those used for conventional calcination is possible. The high treatment temperatures act in an advantageous manner on the speed with which the crystal structure of the noble metal particles is developed.

The figure shows the main layout of a possible apparatus for thermal treatment of the catalyst precursor in order to prepare a catalyst in accordance with the invention. The catalyst precursor is the starting material (1) and is supplied continuously to a gas disperser (2). To disperse the powdered starting material, the disperser is provided with an inert dispersing gas (3), generally nitrogen. After leaving the disperser, the dispersing gas loaded with starting material is admixed with a so-called carrier gas (6) which has been heated in heating unit (7), before the mixing process, to an extent such that the temperature of the solids/gas dispersion after mixing is between about 350 and 500° C. At this temperature, the solids/gas dispersion enters a reaction tube (4) which is heated from outside by a heating device (5) to the desired treatment temperature between 1000 and 1800° C. The volume flow of the carrier gas added is such that the desired treatment time for the starting material is obtained inside the reaction tube, taking into account the dimensions of the reaction tube. After leaving the reaction tube, the carrier gas stream and the starting material enter a rapid cooling unit (8) in which the treated starting material is very rapidly cooled to a temperature of less than about 500° C. by blowing in, for example, nitrogen (9). Finally, in the filter unit (10), the final catalyst material is separated form the carrier gas and is discharged as product (11).

Due to the short residence time of the starting material in the reaction tube, there is only a small transfer of heat due to thermal conduction via the gas phase. Rather, the starting material is mainly heated very rapidly by radiated heat from the wall of the reaction tube and accordingly can also be cooled again very rapidly. To avoid the introduction of air, a slight overpressure is maintained inside the entire apparatus.

As a result of the short-term thermal treatment described, the particle sizes of the noble metal particles are enlarged only very slightly. Due to thermal treatment in conventional rotary kilns, or batchwise in chamber kilns, such short treatment times as those achieved with the apparatus described cannot be realised. In addition, in comparison to conventional thermal treatments in which the goods to be treated are introduced in dishes, vats or other containers, there is substantially less agglomeration and caking of the catalyst material. This is achieved by dispersing the catalyst in a continuous stream of carrier gas.

Catalysts according to the invention have only small average particle sizes of less than 15 nm, preferably less than 10 nm, due to the special thermal treatment process. Their specific metal surface area is in the range 20 to 200 m$^2$/g. At the same time, they have a high crystallinity. As shown by determining the relative degree of crystallinity $C_x$ defined above, this is a factor of 2, and in general even a factor of 5, greater than the relative degree of crystallinity of traditional catalysts.

A preferred area of application of the catalyst according to the invention is its use as anode or cathode catalyst in fuel cells. In PEM fuel cells (polymer electrolyte membrane fuel cells), platinum and platinum alloys on a conductive support material (mostly carbon black or graphite) are used as anode and cathode catalyst. The concentration of noble metal is between 10 and 80 wt. %, with respect to the total weight of catalyst.

For the anode side of PEM fuel cells (polymer electrolyte membrane fuel cells), carbon black supported platinum/ruthenium catalysts are generally used. The ratio platinum/ruthenium is in the range Pt/Ru=5:1 to 1:5 (atomic ratio), wherein the ruthenium, in an electrochemical Redox reaction with water ("spill over effect"), reduces CO-poisoning of the platinum catalyst. Carbon monoxide-containing hydrogen mixtures are used in the case of reformate-operated fuel cells.

PtRu electrocatalysts have long been known in the prior art relating to this area. To condition the materials for PtRu electrocatalysts, costly batch processes are used in which the size of the catalyst particles is increased.

For the cathode side of PEM fuel cells, pure Pt catalysts with a Pt loading of 20 to 80 wt. % are preferably used. However, alloys of platinum with base metals (BM) such as chromium, tungsten, nickel, copper or cobalt are also used. The amounts added here are generally in the range Pt/BM=5:1 to 1:5 (atomic ratio).

With an anode catalyst according to the invention, based on PtRu/C, the high crystallinity brings about reduced adsorption of carbon monoxide on the crystallite surface and thus a reduced tendency to be poisoned. The catalyst thus has a higher tolerance towards carbon monoxide.

On the cathode side of fuel cells, where pure platinum catalysts are used, the activity of the catalyst for oxygen reduction reaction (ORR) is determined by the number of crystallite planes in the platinum crystal. In order to increase the activity of Pt electrocatalysts, therefore, it is insufficient simply to maximise the Pt surface area. Rather, it is necessary to achieve high crystallinity with large Pt surface areas in order to maximise the fraction of (100), (110) and (111) platinum surface atoms in proportion to the total number of platinum atoms. This requirement is complied with in an ideal manner by the catalyst according to the invention. Therefore it is especially suitable for use in low-temperature fuel cells (PEMFC, DMFC, PAFC).

Having now generally described the invention, the same may be more readily understood through the following reference to the following examples, which are provided by way of illustration and are not intended to limit the present invention unless specified.

EXAMPLES

The following examples are intended to explain the invention further.

Example 1

Anode Catalyst for PEM Fuel Cells

Two kilograms of a carbon black supported electrocatalyst (noble metal loading 26.4 wt. % platinum and 13.6 wt. % ruthenium on Vulcan XC 72, atomic ratio Pt:Ru=1:1, prepared in accordance with U.S. Pat. No. 6,007,934) are metered into a gas disperser using a dosing balance and finely distributed with nitrogen as dispersing gas. The catalyst is then transported into the reaction tube in a stream of nitrogen preheated to 350° C.

Process Parameters:

| Carrier gas: | nitrogen |
|---|---|
| Amount of carrier gas: | 8 m³/hour (nitrogen) |
| Temperature (carrier gas): | 350° C. |
| Treatment temperature: | 1300° C. |
| Treatment time: | 3 s (approx) |
| Amount metered in: | 1100 g/hour |

The treated catalyst is cooled with nitrogen in the rapid cooling unit and collected in the filter unit. A process control system is used to adjust the parameters and to monitor the same.

The catalyst treated in this way has the following properties:

Radiographic Measurements (Reflection hkl 111, 2 Theta ca. 40°):

| Particle size (XRD): | 6.3 nm |
|---|---|
| Lattice constant: | 0.3852 nm |
| Intensity ($I_x$, XRD): | 2800 counts |
| Intensity ($I_a$, XRD) | 400 counts |
| Degree of crystallinity $C_x$: | 6 |

For comparison, the untreated starting material has the following data:

| Particle size (XRD): | 2.6 nm |
|---|---|
| Lattice constant: | 0.3919 nm |
| Intensity ($I_x$, XRD): | 800 counts |
| Intensity ($I_a$, XRD) | 400 counts |
| Degree of crystallinity $C_x$: | 1 |

Due to the high crystallinity and, at the same time, small particle size, the treated electrocatalyst exhibits very good electrical properties in a PEM fuel cell, in fact as an anode catalyst under both hydrogen/air and also reformate/air operation.

Comparison of Example 1

PtRu/C with Conventional Thermal Treatment 100 grams of the carbon black-supported electrocatalyst (noble metal loading 26.4 wt. % platinum and 13.6 wt. % ruthenium on Vulcan XC 72, atomic ratio Pt:Ru=1:1, compare with example 1) are treated at 850° C. for 60 min under nitrogen in a conventional batch process. After thermal treatment in the kiln the material is allowed to cool under a protective gas.

Properties:

| Particle size (XRD): | 13.6 nm |
|---|---|
| Lattice constant: | 0.3844 nm |
| Intensity ($I_x$, XRD): | 1300 counts |
| Intensity ($I_a$, XRD) | 400 counts |
| Degree of crystallinity $C_x$: | 2.25 |

In direct contrast to example 1, the catalyst has a lower performance in PEM fuel cells due to the high particle size of 13.6 nm.

Example 2

Pt/C Supported Catalyst for PEM Fuel Cells

One kilogram of a carbon black-supported electrocatalyst (platinum loading 40 wt. % on Vulcan XC 72) is metered into a gas disperser using a dosing balance and finely distributed with nitrogen as the injector gas stream. The catalyst is then transported into the reaction tube in a stream of nitrogen preheated to 350° C. Process parameters:

| Carrier gas: | nitrogen |
|---|---|
| Amount of carrier gas: | 8 m³/hour (nitrogen) |
| Temperature (carrier gas): | 350° C. |
| Treatment temperature: | 1200° C. |
| Treatment time: | 3 s (approx) |
| Amount metered in: | 1000 g/hour |

The treated catalyst is cooled with nitrogen in the rapid cooling unit and collected in the filter unit. A process control system is used to adjust the parameters and to monitor the same.

The catalyst treated in this way has the following properties:

| Particle size (XRD): | 6.5 nm |
|---|---|
| Lattice constant: | 0.3931 nm |
| Intensity ($I_x$, XRD): | 3000 counts |
| Intensity ($I_a$, XRD) | 400 counts |
| Degree of crystallinity $C_x$: | 6.5 |

For comparison the untreated starting material has the following data:

| Particle size (XRD): | 3.9 nm |
|---|---|
| Lattice constant: | 0.3937 nm |
| Intensity ($I_x$, XRD): | 1600 counts |
| Intensity ($I_a$, XRD) | 400 counts |
| Degree of crystallinity $C_x$: | 3 |

Due to the high degree of crystallinity and, at the same time, small particle size, the treated electrocatalyst exhibits very good electrical properties in a PEM fuel cell, in fact in particular as a cathode catalyst under hydrogen/air operation.

Example 3

PtCr/C Alloy Catalyst for PEM Fuel Cells

One kilogram of a carbon black-supported electrocatalyst (platinum content 40 wt. % on Vulcan XC 72, atomic ratio Pt:Cr=3:1) are metered into a gas disperser using a dosing balance and finely distributed with nitrogen as dispersing gas. The catalyst is then transported into the reaction tube in a stream of nitrogen preheated to 350° C.

Process Parameters:

| Carrier gas: | nitrogen |
|---|---|
| Amount of carrier gas: | 8 m³/hour (nitrogen) |
| Temperature (carrier gas): | 350° C. |
| Treatment temperature: | 1400° C. |
| Treatment time: | 3 s (approx) |
| Amount metered in: | 1000 g/hour |

The treated catalyst is cooled with nitrogen in the rapid cooling unit and collected in the filter unit. A process control system is used to adjust the parameters and to monitor the same.

The catalyst treated in this way has the following properties:

Radiographic measurements (Reflection hkl 111, 2 Theta ca. 40°):

| Particle size (XRD): | 7.5 nm |
|---|---|
| Lattice constant: | 0.385 nm |
| Intensity ($I_x$, XRD): | 3200 counts |
| Intensity ($I_a$, XRD) | 400 counts |
| Degree of crystallinity $C_x$: | 7 |

Due to the high degree of crystallinity and, at the same time, small particle size, the treated electrocatalyst exhibits very good electrical properties in a PEM fuel cell, in fact in particular as a cathode catalyst under hydrogen/air operation.

Comparison of Example 2

PtCr/C with Conventional Thermal Treatment 100 grams of a carbon black-supported electrocatalyst (platinum content 40 wt. % platinum on Vulcan XC 72, atomic ratio Pt:Cr=3:1, compare with example 3) are treated under forming gas at 900° C. for 60 min in a conventional batch process. After thermal treatment in the kiln, the material is allowed to cool under a protective gas.

Properties:

| Particle size (XRD): | 16 nm |
|---|---|
| Lattice constant: | 0.386 nm |
| Intensity ($I_x$, XRD): | 2000 counts |
| Intensity ($I_a$, XRD) | 400 counts |
| Degree of crystallinity $C_x$: | 4 |

In direct comparison to example 4, the catalyst, has a low performance in PEM fuel cells due to the high particle size of 16 nm.

Example 4

Pt/Aluminium Oxide Catalyst for Gas Phase Catalysis

Ca. 2 kg of a moist powder, prepared by pore volume impregnation of the support with the noble metal solution (incipient wetness method) consisting of:

| 78 | wt. % aluminium oxide (γ-$Al_2O_3$, BET surface area 140 m²/g) |
|---|---|
| 20 | wt. % water |
| 2 | wt. % platinum nitrate | are metered into the gas disperser using a dosing balance, finely distributed with nitrogen as dispersing gas and transported into the reaction tube.

Process Parameters:

| Carrier gas: | nitrogen |
|---|---|
| Amount of carrier gas: | 8 m³/hour (nitrogen) |
| Temperature (carrier gas): | 350° C. |

-continued

| | |
|---|---|
| Treatment temperature: | 1100° C. |
| Treatment time: | 3 s (approx) |
| Amount metered in: | 1000 g/hour |

After leaving the reaction tube, the treated catalyst is cooled with nitrogen in the rapid cooling unit and collected in the filter unit. A process control system is used to adjust the parameters and to monitor the same.

The catalyst treated in this way has the following properties:

| | |
|---|---|
| Composition: | 2.5 wt. % Pt on aluminium oxide |
| Particle size (XRD): | 5 nm |
| Intensity($I_x$, XRD): | 3400 counts |
| Intensity ($I_a$, XRD) | 400 counts |
| Degree of crystallinity $C_x$: | 7.5 |

The catalyst treated in a conventional process (900° C., residence time 60 min, nitrogen), on the other hand, has a particle size of 12 nm and a degree of crystallinity $C_x$=4.

The catalyst from example 4 is used in gas phase catalysis, for example as a catalyst for the treatment of exhaust gases from internal combustion engines or as a catalyst for the selective oxidation of CO in so-called PROX reactors for the purification of hydrogen in fuel cell systems.

Due to the small particle size and, at the same time, high crystallinity, very good results are obtained, in particular for the working life/durability of the catalyst.

While the invention has been described in connection with specific embodiments thereof, it will be understood that it is capable of further modifications and this application is intended to cover any variations, uses, or adaptations of the invention following, in general, the principles of the invention and including such departure from the present disclosure as come within known or customary practice within the art to which the invention pertains and as may be applied to the essential features hereinbefore set forth and as follows in the scope of the appended claims.

What is claimed:

1. A noble metal-containing supported catalyst comprising one or more noble metals selected from the group consisting of Au, Ag, Pt, Pd, Rh, Ru, Ir, Os and alloys thereof deposited in the form of noble metal particles on a powdered support material, wherein the noble metal particles have a relative degree of crystallinity of greater than 2 as determined by X-ray diffraction and an average particle size of between about 2 and about 10 nm.

2. A supported catalyst according to claim 1, wherein the relative degree of crystallinity as determined by X-ray diffraction is greater than 5.

3. A supported catalyst according to claim 1, wherein the support material is a carbon-containing material selected from the group consisting of carbon black, graphite, active carbon and fibrous, and graphitic nanotubes.

4. A supported catalyst according to claim 3, wherein the noble metals are alloyed with at least one base metal selected from the group consisting of Ti, Zr, V, Cr, Mn, Fe, Co, Ni, Cu and Zn.

5. A supported catalyst according to claim 3, wherein the supported catalyst contains Pt on carbon black with a surface area of at least 40 $m^2/g$ in a concentration between 5 and 80 wt. % based on the total weight of support material and Pt.

6. A supported catalyst according to claim 3, wherein the supported catalyst contains a Pt/Ru alloy on carbon black with a surface area of at least 40 $m^2/g$ in a concentration between 5 and 80 wt. % based on the total weight of support material and alloy, and wherein the atomic ratio Pt to Ru is between 5:1 and 1:5.

7. A supported catalyst according to claim 1, wherein the support material is an oxidic material selected from the group consisting of active aluminum oxide, aluminum silicate, zeolite, titanium oxide, zirconium oxide, rare earth oxides, and mixtures thereof.

8. An anode or cathode catalyst for a low-temperature fuel cell comprising the catalyst of claim 1.

9. A catalyst for the treatment of exhaust gases from an internal combustion engine comprising the catalyst of claim 1.

10. A process for preparing a supported catalyst according to claim 1, comprising providing a support material coated with a precursor of the noble metals by pore volume impregnation; drying the support material; and thermally treating the dried support material at a temperature between 1000 and 1800° C. for a period of less than one minute, wherein crystallinity is developed.

11. A process for preparing a supported catalyst according to claim 1, comprising providing a support material coated with a precursor of the noble metals by homogeneous deposition from solution; drying the support material; and thermally treating the dried support material at a temperature between 1000 and 1800° C. for a period of less than one minute, wherein crystallinity is developed.

12. A process according to claim 11, wherein heat energy required for thermal treatment is transferred to the support material by radiation.

13. A process according to claim 11, wherein the support material coated with the noble metal is continuously dispersed in an inert carrier gas stream at a temperature between about 300 and 500° C., passed through a heated reactor and, after leaving the reactor, is rapidly cooled and then separated from the carrier gas stream.

14. A process according to claim 13, wherein the inert gas stream and support material are cooled to a temperature below 500° C. by admixing an inert and cooled gas or mixture of gases with the carrier gas stream.

15. A process for preparing a supported catalyst according to claim 1 comprising providing a precursor of the supported catalyst, the precursor having one or more catalytically active noble metals with an average particle size between 1 and 10 nm, on a surface of the support material, and thermally treating the precursor at a temperature between about 1000 and 1800° C. for a period of less than one minute.

* * * * *